(12) United States Patent
Zhong et al.

(10) Patent No.: US 11,182,621 B2
(45) Date of Patent: Nov. 23, 2021

(54) SYSTEMS AND METHODS FOR BEHAVIOR UNDERSTANDING FROM TRAJECTORIES

(71) Applicant: Sportlogiq Inc., Montreal (CA)

(72) Inventors: Yatao Zhong, Burnaby (CA); Nazanin Mehrasa, Coquitlam (CA); Luke Bornn, Sacramento, CA (US); Gregory Peter Mori, Burnaby (CA)

(73) Assignee: Sportlogiq Inc., Montreal (CA)

( * ) Notice: Subject to any disclaimer, the term of this patent is extended or adjusted under 35 U.S.C. 154(b) by 217 days.

(21) Appl. No.: 16/388,588

(22) Filed: Apr. 18, 2019

(65) Prior Publication Data
US 2019/0251366 A1 Aug. 15, 2019

Related U.S. Application Data

(63) Continuation of application No. PCT/CA2018/050010, filed on Jan. 5, 2018.
(Continued)

(51) Int. Cl.
*G06K 9/00* (2006.01)
*G08G 1/01* (2006.01)
(Continued)

(52) U.S. Cl.
CPC ....... *G06K 9/00771* (2013.01); *G06F 40/169* (2020.01); *G06K 9/00718* (2013.01);
(Continued)

(58) Field of Classification Search
CPC ..... G06K 2009/00738; G06K 9/00718; G06K 9/00724; G06K 9/00771; G06K 9/6256;
(Continued)

(56) References Cited

U.S. PATENT DOCUMENTS 9,613,276 B2 4/2017 Burghouts
9,740,977 B1 * 8/2017 Moon ................ G06K 9/00771
(Continued)

FOREIGN PATENT DOCUMENTS

WO 2015196281 A1 12/2015

OTHER PUBLICATIONS

Extended European Search Report (EESR) issued in correspondence EP application No. 18735897.3; search completed Jun. 22, 2020.
(Continued)

*Primary Examiner* — Tom Y Lu
(74) *Attorney, Agent, or Firm* — CPST Intellectual Property Inc.; Brett J. Slaney

(57) ABSTRACT

Methods are provided for automatically analyzing and understanding activities and interactions. One method comprises receiving at least location information for one or more individual objects in a scene at a given time; applying at least one machine learning or artificial intelligence technique to automatically learn an informative representation of location trajectory data for each object; and identifying and analyzing individual and group activities in the scene based on the trajectory data. Another method comprises receiving at least location information for one or more individual objects in a scene at a given time; receiving visual information about the scene and at least one individual object in the scene; applying at least one machine learning or artificial intelligence technique to automatically learn an informative representation of location trajectory data, and to automatically learn an informative representation of visual appearance data; and combining the location trajectory and visual appearance data.

29 Claims, 10 Drawing Sheets

Related U.S. Application Data

(60) Provisional application No. 62/443,137, filed on Jan. 6, 2017.

(51) Int. Cl.

| | | |
|---|---|---|
| *G08G 1/04* | (2006.01) | |
| *G06N 3/04* | (2006.01) | |
| *G06N 3/08* | (2006.01) | |
| *G06F 40/169* | (2020.01) | |
| *G06N 20/00* | (2019.01) | |
| *G06K 9/62* | (2006.01) | |

(52) U.S. Cl.
CPC ....... *G06K 9/00724* (2013.01); *G06K 9/6256* (2013.01); *G06N 3/0454* (2013.01); *G06N 3/08* (2013.01); *G06N 20/00* (2019.01); *G08G 1/0116* (2013.01); *G08G 1/0129* (2013.01); *G08G 1/04* (2013.01); *G06K 2009/00738* (2013.01); *G06N 3/0445* (2013.01); *G06T 2207/30241* (2013.01)

(58) Field of Classification Search
CPC .... G06N 20/00; G06N 3/0445; G06N 3/0454; G06N 3/08; G06T 2207/30241; G08G 1/0116; G08G 1/0129; G08G 1/04; G06F 40/169
See application file for complete search history.

(56) References Cited

U.S. PATENT DOCUMENTS

| | | | |
|---|---|---|---|
| 10,402,655 | B2 | 9/2019 | Javan Roshtkhari et al. |
| 2013/0241730 | A1* | 9/2013 | Saitwal ................ G06K 9/3241 340/540 |
| 2015/0003671 | A1 | 1/2015 | Saitwal et al. |
| 2015/0324636 | A1* | 11/2015 | Bentley ................... A63F 13/00 386/227 |
| 2016/0132755 | A1* | 5/2016 | Ikeda ................. G06K 9/00778 382/159 |
| 2017/0165570 | A1* | 6/2017 | Lucey ..................... A63F 13/35 |
| 2017/0220871 | A1* | 8/2017 | Ikeda ..................... G08B 25/00 |
| 2018/0032858 | A1* | 2/2018 | Lucey ..................... A63F 13/25 |

OTHER PUBLICATIONS

Jingxin Xu et al.; "Automatic Event Detection for Signal-Based Surveillance"; arxiv.org, Cornell University Library, 201 Olin Library Cornell University Ithaca, NY 14853, Dec. 6, 2016.
H. Kuehne, H. Jhuang, E. Garrote, T. Poggio, T. Serre: "HMDB: a large video database for human motion recognition", The International Conference on Computer Vision (ICCV), 2011.
Andrej Karpathy, George Toderici, Sanketh Shetty, Thomas Leung, Rahul Sukthankar, Li Fei-Fei: "Large-scale video classification with convolutional neural networks", Computer Vision and Pattern Recognition (CVPR), pp. 1725-1732, 2014.
Du Tran, Lubomir Bourdev, Rob Fergus, Lorenzo Torresani, Manohar Paluri: "Learning spatiotemporal features with 3d convolutional networks", International Conference on Computer Vision (ICCV), pp. 4489-4497, 2015.
Tian Lan, Yang Wang, Weilong Yang, Stephen Robinovitch, Greg Mori: "Discriminative Latent Models for Recognizing Contextual Group Activities", IEEE Transactions on Pattern Analysis and Machine Intelligence (T-PAMI), pp. 1549-1562, 2012.
G. Médioni, I. Cohen, F. Brémond, S. Hongeng, R. Nevatia: "Event Detection and Analysis from Video Streams", IEEE Transactions on Pattern Analysis and Machine Intelligence (T-PAMI), pp. 873-889, 2001.
Joachim Gudmundsson, Michael Horton: "Spatio-Temporal Analysis of Team Sports—A Survey", arXiv preprint arXiv:1602.06994, 2016.
Sepp Hochreiter, Jurgen Schmidhuber: "Long short-term memory", Neural computation, pp. 1735-1780, 1997.
Daniel Weinland, Remi Ronfard, Edmond Boyer: "A survey of vision-based methods for action representation, segmentation and recognition", Computer Vision and Image Understanding (CVIU), pp. 224-241, 2011.
M. Javan Roshtkhari M.D. Levine, "Online dominant and anomalous behavior detection in videos", Computer Vision and Pattern Recognition (CVPR). 2013 IEEE Conference on, 2013, pp. 2609-2616.
M. Javan Roshtkhari. M.D. Levine, "Human activity recognition in videos using a single example", Image and Vision Computing, 2013, 31(11), 864-876.
Karen Simonyan, Andrew Zisserman: "Two-stream convolutional networks for action recognition in videos", Advances in Neural Information Processing Systems (NIPS), pp. 568-576, 2014.
Jeffrey Donahue, Lisa Anne Hendricks, Sergio Guadarrama, Marcus Rohrbach, Subhashini Venugopalan, Kate Saenko, Trevor Darrell: "Long-term recurrent convolutional networks for visual recognition and description", Computer Vision and Pattern Recognition (CVPR), pp. 2625-2634, 2015.
Wongun Choi, Khuram Shahid, Silvio Savarese: "What are they doing?: Collective activity classification using spatio-temporal relationship among people", ComputerVisionWorkshops (ICCV Workshops), pp. 1282-1289, 2009.
Mohamed Rabie Amer, Peng Lei, Sinisa Todorovic: "Hirf: Hierarchical random field for collective activity recognition in videos", European Conference on Computer Vision (ECCV), pp. 572-585, 2014.
Tian Lan, Leonid Sigal, Greg Mori: "Social Roles in Hierarchical Models for Human Activity Recognition", Computer Vision and Pattern Recognition (CVPR), 2012.
V. Ramanathan, B. Yao, and L. Fei-Fei. "Social role discovery in human events". In Computer Vision and Pattern Recognition (CVPR), Jun. 2013.
Z. Deng, M. Zhai, L. Chen, Y. Liu, S. Muralidharan, M. Roshtkhari, and G. Mori: "Deep Structured Models for Group Activity Recognition", British Machine Vision Conference (BMVC), 2015.
Stephen S. Intille, Aaron Bobick: "Recognizing Planned, Multiperson Action", Computer Vision and Image Understanding (CVIU), pp. 414-445, 2001.
International Search Report issued in corresponding PCT application No. PCT/CA2018/050010; search completed Mar. 15, 2018.
Morris, Brendan Tran, and Mohan Manuhhai Trivedi. "A survey of vision-based trajectory learning and analysis for surveillance." IEEE transactions on circuits and technology. vol. 18, Issue 8, Aug. 2008: pp. 1114-1127.
Hu, Weiming, et al. "A survey on visual surveillance of object motion and behaviors." IEEE Transactions on Systems, Man, and Cybernetics, Part C (Applications and Reviews) vol. 34 Issue Aug. 3, 2004: pp. 334-352.
Turaga, Pavan, et al. "Machine recognition of human activities: A survey." IEEE Transactions on Circuits and Systems for Video technology. vol. 18, Issue 11, Nov. 2008: pp. 1473-1488.
Crimson, W. Eric L., et al. "Using adaptive tracking to classify and monitor activities in a site." Computer Vision and Pattern Recognition, 1998. Proceedings. 1998 IEEE Computer Society Conference on. IEEE, Jun. 1998.
Makris, Dimitrios, and Tim Ellis. "Learning semantic scene models from observing activity in visual surveillance." IEEE Transactions on Systems, Man, and Cybernetics, Part B (C)bernetics). vol. 35, Issue 3, Jun. 2005: pp. 397-408.
Yang, Che-Chang, and Yeh-Liang Hsu. "A review of accelerometry-based wearable motion detectors for physical activity monitoring." Sensors. vol. 10, Issue 8, Aug. 2010: pp. 7772-7788.

\* cited by examiner

SYSTEMS AND METHODS FOR BEHAVIOR UNDERSTANDING FROM TRAJECTORIES

CROSS-REFERENCE TO RELATED APPLICATION(S)

This application is a continuation of PCT Application No. PCT/CA2018/050010 filed on Jan. 5, 2018, which claims priority to U.S. Provisional Patent Application No. 62/443,137 filed on Jan. 6, 2017, both incorporated herein by reference in their entirety.

TECHNICAL FIELD

The following relates to systems and methods for automated content analysis, particularly for learning object trajectory features for video analyses.

DESCRIPTION OF THE RELATED ART

Human activity analysis is a fundamental problem in many computer vision applications. The trajectory a person (or other object) takes while moving can provide vital information to conduct an activity analysis. For example, the path followed by a walking person would look very different from that of a basketball player dribbling around an opponent.

The existing literature on analyzing human activities is extensive. A large volume of work has focused on visual features for recognizing individual actions. These are typically built from challenging unconstrained internet video datasets such as HMDB-51 [1] and Sports-1M [2]. These datasets have been used to learn powerful feature descriptors (e.g. C3D [3]), which can be leveraged. A body of literature focuses on group activity and human interaction [1, 2, 4, 5, 6, 7], some of which incorporate spatial information of individuals. However, these representations tend to be hand-crafted and do not sufficiently encode the rich information of individual person movements and their interactions over time.

Thorough surveys of earlier work include Weinland et al. [8]. Here the more relevant prior art in activity recognition, including individual actions, group multi-person activities, and trajectory analysis are described.

Individual Human Action Recognition: Many of the approaches for vision-based human action recognition usually rely heavily on the visual appearance of a human in space and time. Examples include context based spatio-temporal bag of words methods [9, 10, 11, 12]. More recent approaches include the two-stream network of Simonyan and Zisserman [13], which fuse temporal and spatial appearance feature branches into a single network. Karpathy et al. [2] has conducted extensive experiments on when and how to fuse information extracted from video frames. Donahue et al. [14] suggests extracting features from each frame and encoding temporal information using a recurrent neural net (LSTM [7]) for action recognition. Tran et al. [3] extended traditional 2D convolution to the 3D case, where filters are applied to the spatial dimensions and temporal dimension simultaneously. The temporal information in those models is based on pixel displacement; i.e., temporal correspondence between the pixels which encode the local motion of small parts of the human body.

Group Activity Recognition: Group activity recognition examines classifying the behavior of multiple, interacting people. Effective models typically consider both individual actions and person-level interactions within the group. Prior attempts use hand-crafted features and model interactions with graphical models. For example, Choi et al. [15] build hand-crafted descriptors of relative human poses. Lan et al. [4] and Amer et al. [16] utilize hierarchical models to understand collective activity among a group of people at different levels, ranging from atomic individual action to group activity in the scene.

The concept of social roles performed by people during interactions has also been studied [17, 18]. These methods use hand-crafted representations of inter-person relationships which are required to be modified and changed for different applications. Another line of work introduces structures into deep learning frameworks by integrating neural networks and graphical models in a unified framework. For example, Deng et al. [19] apply deep structured models to collective activity recognition, learning dependencies between the actions of people in a scene.

Trajectory Data Analytics: There exists significant literature on trajectory analysis focusing on team sports, such as basketball, soccer, and hockey. Applications within sports analytics include analyzing player and team performance, and mining underlying patterns that lead to certain results. Work in this field has included various statistical models to capture the spatio-temporal dynamics in player trajectories. For example, one can refer to a survey on detailed team sports analysis with trajectory data by Gudmundsson and Horton [6].

Classic examples in the vision literature include Intille and Bobick [20] who analyzed American football plays based on trajectory inputs. Médioni et al. [5] utilized relative positioning between key elements in a traffic scene, such as vehicles and checkpoints, to recognize activities.

SUMMARY

The following discloses methods to automatically learn representations of object trajectories, particularly person trajectories for activity analysis and combine them with the visual attributes. The disclosed systems and methods define motion as the overall location of each individual human at a given time, rather than the pixel displacements in the local regions. In other words, here the motion information is about the trajectory of a human subject which is being analyzed.

It is recognized that previous attempts that apply deep structured models to collective activity recognition do not consider spatio-temporal relationships between participants, which can provide a strong indication about how a group activity is formulated. Thus, the following also proposes a model to incorporate spatial information by learning the dynamics of trajectories of each participant as well as their relative movements.

Moreover, in contrast to building hierarchical LSTMs to model multiple interacting people over time, the systems and methods described herein learn the important and useful trajectory features directly from the location information. The learnt information can be used with an inference mechanisms to determine and analyze activities and events. Also, instead of an image representation of trajectories, the following proposes to directly learn to extract meaningful information from the raw trajectories.

In one aspect, there is provided a method of automatically analyzing and understanding activities and interactions, the method comprising: receiving at least location information for one or more individual objects in a scene at a given time; applying at least one machine learning or artificial intelligence technique to automatically learn an informative representation of location trajectory data for each object; identifying and analyzing individual and group activities in the scene based on the trajectory data; and providing at least one individual or group activity as an output.

In another aspect, there is provided a method of automatically analyzing and understanding activities and interactions, the method comprising: receiving at least location information for one or more individual objects in a scene at a given time; receiving visual information about the scene and at least one individual object in the scene; applying at least one machine learning or artificial intelligence technique to automatically learn an informative representation of location trajectory data; applying at least one machine learning or artificial intelligence technique to automatically learn an informative representation of visual appearance data; combining the location trajectory and visual appearance data to identify individual and group activities in the scene; and providing at least one individual or group activity as an output.

In other aspects, there are provided systems and computer readable media configured in accordance with these methods.

BRIEF DESCRIPTION OF THE DRAWINGS

Embodiments will now be described by way of example only with reference to the appended drawings wherein.

DETAILED DESCRIPTION

The following addresses the problem of analyzing the behaviors of a group of people, as well as the actions taken by each individual person. As an example, in the context of sport, the disclosed method analyzes player activities in team sports by using their location over time in addition to the visual appearance information about each player's body pose.

An advantage of the method described herein is that it automatically learns the important information from both visual appearance and trajectory information for human activity understanding. Compared to prior attempts, it has been found that the disclosed method is capable of capturing spatio-temporal dependencies from visual appearance and person trajectories. In addition, some exemplary evaluations suggest that person position over time plays an important role when analyzing human activities.

The following relates to methods and systems to automatically learn and understand human activities and interactions from trajectories and appearance information. The representative characteristics of the trajectories which are related to the patterns of motion exhibited by people when performing different activities are learnt automatically. These trajectory features are used in a two-stream model that takes both visual data and person trajectories as the inputs for human activity analysis. The disclosed model utilizes one stream to learn the visual temporal dynamics from input videos and another stream to learn the space-time dependencies from trajectories; which is capable of learning complex representations of human movement. Experimental results indicate the efficacy of the disclosed algorithms on several tasks on real-world basketball and hockey scenes against state-of-the-art methods. In addition, experiments suggest that person trajectories can provide strong spatio-temporal cues, which improve performance over baselines that do not incorporate trajectory data. Although the proposed model is described as being adopted for individual and group activity recognition in team sports as an exemplary embodiment, it can be used for other applications in which at least one person is interacting with other objects and/or people in the scene.

An implementation of the systems and methods described herein uses a sequence of location data of the humans and object to automatically learn an appropriate representation of the trajectory data to be used for activity recognition and event understanding in a scene. The method further combines the trajectory data with the visual information to improve the accuracy for event description from both visual data and trajectory information. The following describes the method and system for developing a human activity understanding by using both visual appearance and location information. The exemplary embodiment described herein detects and identifies individual and group activities in sport videos and some certain aspects are directed to the team sports.

Figure 1:
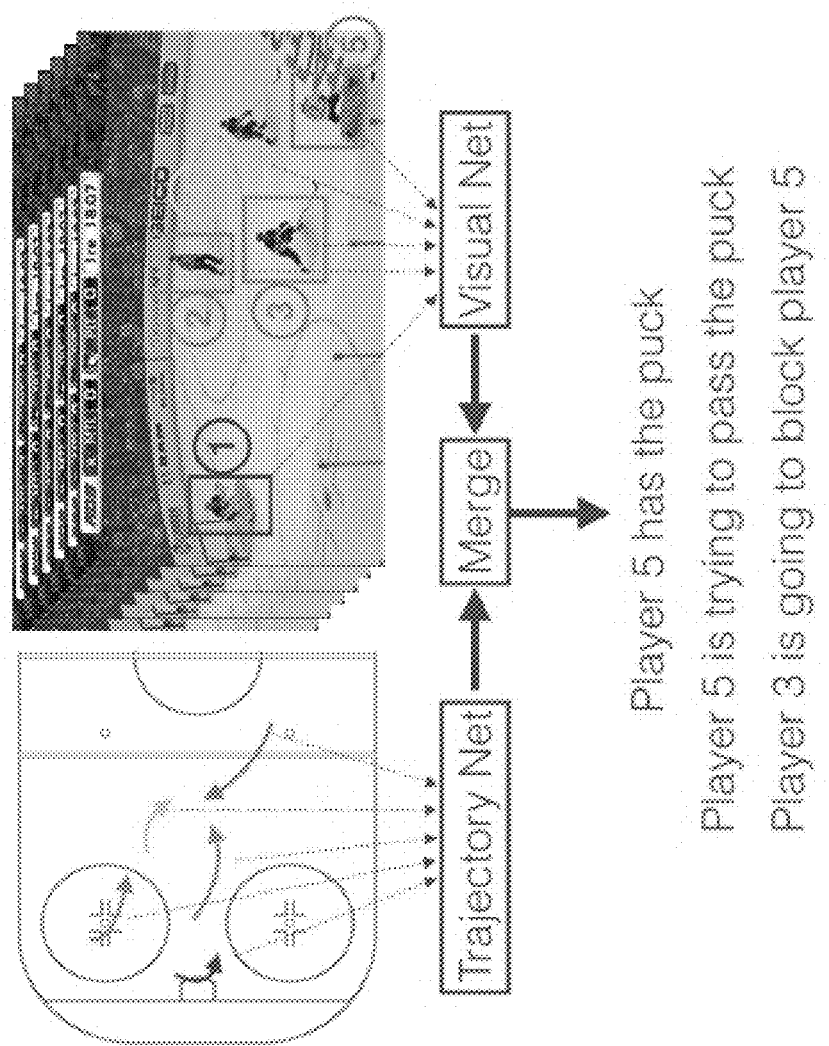
FIG. 1 is a drawing that shows combining visual features with trajectory features for human behavior analysis in videos.

Turning now to the figures, FIG. 1 is an example of a process for event recognition using both trajectory and visual data. The characteristic features from people trajectories are learnt automatically. They can be combined with visual features for analyzing both individual human activities and group/team action(s). In the example shown in FIG. 1, data for a trajectory net is merged with data for a visual net of a hockey scene to assess different movements and events.

Figure 2:
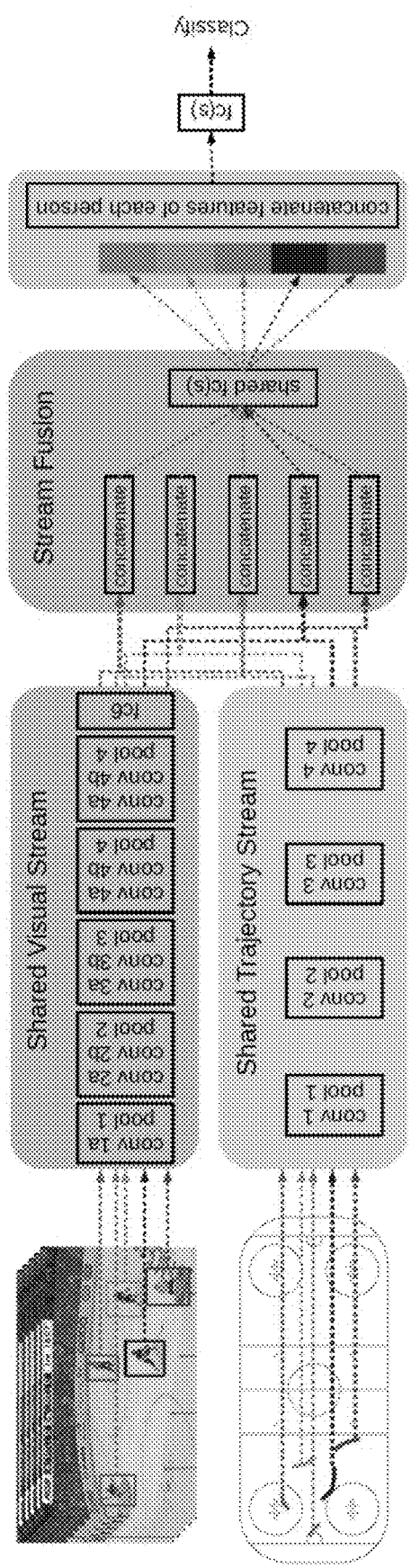
FIG. 2 illustrates an exemplary model of a two-stream network for video analysis which incorporates both location and visual appearance information.

FIG. 2 illustrates an exemplary embodiment of the learning mechanisms for trajectory data and combining them with the visual information with a two stream pipeline, which uses convolutional neural networks for trajectory representation. The trajectory data and visual information can be processed independently and fused together in order to make a decision about the activities and events in the scene.

Figure 9:
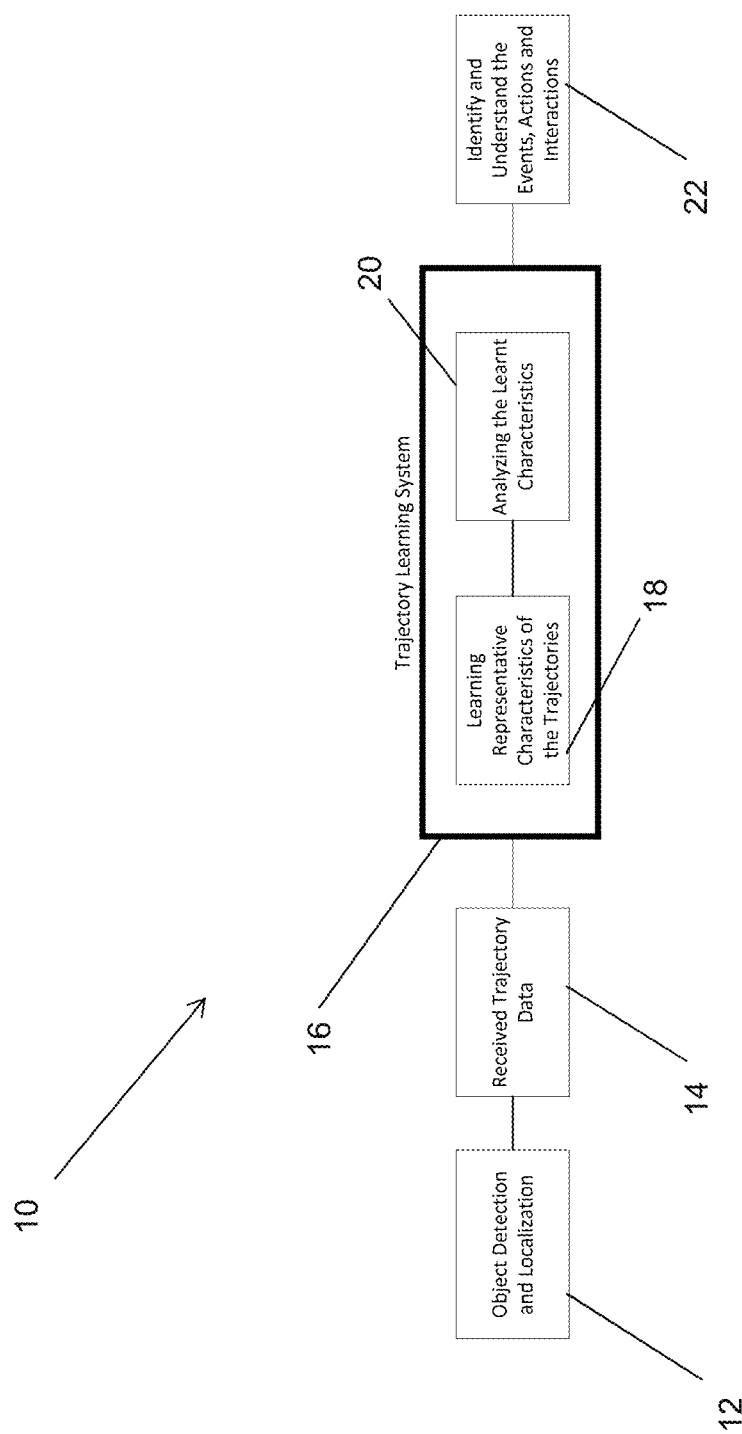
FIG. 9 is a schematic block diagram of a system for automatically learning an effective representations of the trajectory data for event detection and activity recognition.

FIG. 9 illustrates an example of a process for event recognition using only trajectory data of the objects and people in a scene. The system 10 shown in FIG. 9 includes a trajectory learning mechanism, which receives location data of the object and people 12 in the scene as a function of time, connected together as the trajectories 14. The trajectory learning system 16 includes or otherwise operates as a learning mechanism to learn the relevant features 18 from the input data 14 and to analyze the learnt features 20 to determine at least one event and action at a given location and time 22. The system 10 is an example of a system implemented as a computer program in one or more computers in which the systems, components, modules, and techniques described below can be implemented.

Figure 10:
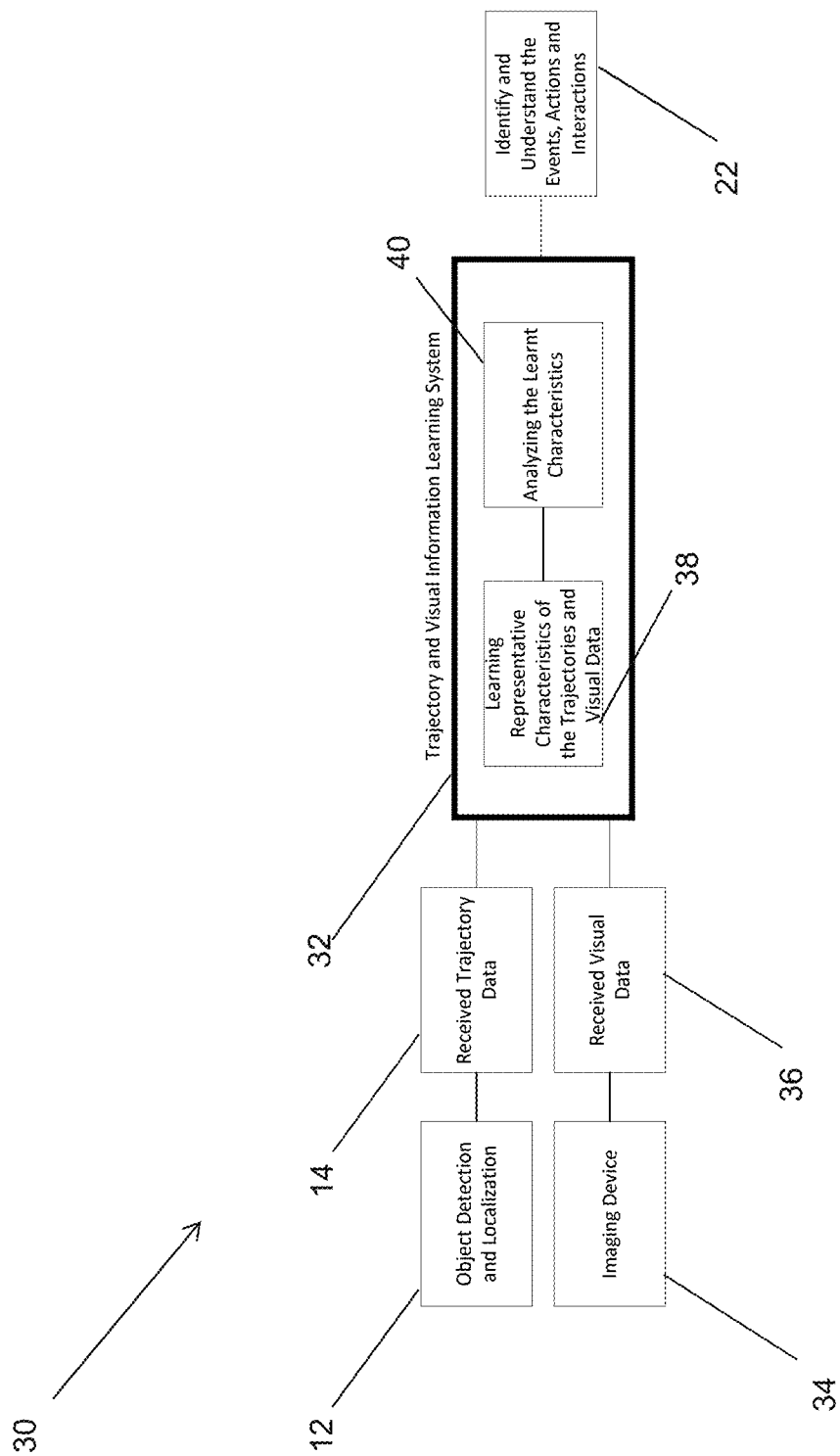
FIG. 10 is a schematic block diagram of a system for event detection and activity recognition by learning an appropriate representation of the trajectories and combining them with the visual data.

FIG. 10 illustrates an example of a process for event recognition which uses both location data and visual information and combines them together. The system 30 shown in FIG. 10 includes a trajectory and visual information learning mechanism, which receives images and/or video data 36 from an imaging device 34 and combines them with the trajectory data 14 for event understanding in a scene. The trajectory and visual learning system 32 includes or otherwise operates as a learning mechanism to learn the relevant features 38 from both the trajectory 14 and visual input data 36 and to analyze the learnt features 40 to determine at least one event and action at a given location and time 22. The system 30 is an example of a system implemented as a computer program in one or more computers in which the systems, components, modules, and techniques described below can be implemented.

Considering the example in FIG. 1, determining what event is taking place in this scene can be done based on the visual appearance of the people in the scene, augmented by descriptions of their trajectories over time. As an example, given a snapshot of time in a hockey game, it is extremely difficult for an observer to determine what a group of players is doing by only looking at each player independently and inspecting the pixels inside the bounding boxes of players. It is generally required to analyze the relative positions of players over time as well, so as to understand the spatio-temporal context and then understand the behavior of each player.

The method described herein uses a two-stream framework that handles multiple persons. For each person, the data in two domains (video and trajectory) go through a feature learning mechanism shared by all people and then the outputs of each person are merged into a single vector as the eventual feature representation. The experimental results indicate the effectiveness of the proposed method for team formations, puck carrier detection in ice-hockey, and event recognition across basketball (NBA) trajectory, hockey (NHL) video datasets, etc.

The disclosed model is built in a two-stream framework, one analyzing trajectory information, the other direct visual appearance. Each stream takes incoming data in different domains as an input. In the model, video clips and person trajectories are fed into the network. For ease of understanding, the following refers to these two streams as the visual stream and the trajectory stream respectively. To integrate the two streams into a unified framework, a combined feature vector can be built by concatenating the output of each stream, followed by a classification scheme.

In order to analyze human behavior as a group, it is found that there are multiple people to handle per sample, each requiring a separate feature extraction mechanism. To this end, one can let all people share the same mechanism for feature extraction. Afterwards the features of all individuals are merged and the concatenated feature treated as the resulting representation. The following describes the details of the model formulation, starting with the structure of each stream, followed by the construction of the model for a single person, and finally the architecture of the model for a group of people in a scene.

Trajectory Stream.

The analysis of the trajectory of one person in a scene can be described as follows. The input to the trajectory stream is a sequence of person locations in the real-world coordinates in the form of $(x_t, y_t)$, where t is the time or the frame number in a video. These inputs are obtained via computer vision based state-of-the-art tracking and camera calibration systems, which provide reasonably accurate, though sometimes noisy, data. However, the trajectory data can be obtained using other methods and non-vision based systems such as hardware based location tracking. To learn the space-time variations in person trajectories, the following proposes to use 1D convolutions.

A person trajectory is typically a continuous signal, and the following proposes a direct way of interpreting a trajectory. A 2D trajectory in world coordinates (e.g., player position in court/rink coordinates) has two separate continuous signals, one for the x series and one for y series. One can split the input $[(x_1, y_1), (x_2, y_2), \ldots, (x_T, y_T)]$ into two sequences $[x_1, x_2, \ldots, x_T]$, and $[y_1, y_2, \ldots, y_T]$, each being a 1D continuous signal. In the present approach these two sequences are treated as two channels. A convolutional neural network can be built on top of these inputs, with a 1D convolution operating on each input. By stacking layers of 1D convolution, one can learn combinations of x and y movements that are indicative of particular action classes.

In detail, let $X \in \mathbb{R}^{N \times T}$ denote the input, $F \in \mathbb{R}^{N \times W \times M}$ denote the filters in a convolutional layer and $O \in \mathbb{R}^{M \times T}$ denote the output, where N is the number of input channels, T is the length of input sequence, W is the filter size and M is the number of filters. To model the behavior of a convolutional layer\footnote, the basic operation can be performed as follows:

$$O_{k,t} = \sigma\left(\sum_{i=1}^{N} \sum_{j=1}^{W} X_{i,t+j-1} F_{i,j,k}\right) \quad (1)$$

In the above formula, $\sigma(\cdot)$ can be any activation function. In the present case, one can choose ReLU for all activations. Each convolutional layer is followed by a max pooling layer to make the model shift-invariant and help reduce the dimension of the output.

Let $$Z \in \mathbb{R}^M \times \left\lceil \frac{T}{S} \right\rceil$$

be the output of max pooling, where S is the step size in the pooling operation, then:

$$Z_{k,t} = \max_{1 \leq j \leq S} O_{k,(t-1) \cdot S + j} \quad (2)$$

To build a network with stacked convolutional and max pooling layers, one can use the output $Z^{l-1}$ at layer l−1 as the input $X^l$ at layer l:

$$X^l = Z^{l-1} \quad (3)$$

The process described in (1) and (2) can be repeated for a number of layers. To obtain the output of the trajectory stream, the output of the last layer can be flattened.

The outputs of the trajectory stream can be grouped and passed to another feature learning algorithm that learns representations for the relative motion patterns of groups of trajectories. For simplicity, the following explains the process for groups of two trajectories; although it can be easily extended to groups of multiple trajectories. A pairwise representation learning encodes interaction cues that can be useful for recognizing actions and interactions (e.g. pass, shot). Pairs are formed relative to a key person/actor, which is either pre-identified or identified automatically. The key actor is often the one who is conducting the main action in a group that characterizes a particular group activity. For example, in the context of sports games a key actor is often the one with possession of the ball or puck at a given time.

Denote the key actor as $P^{(1)}$ and the other actors in the scene as $P^{(2)}, P^{(3)}, \ldots, P^{(N_P)}$. Given a pair, $(P^{(1)}, P^{(i)})$, $i \in [2, N_P]$, the individual trajectory representations of $P^{(1)}$ and $P^{(i)}$ (computed using the trajectory network) are inputs to the pairwise representation learning which can be any machine learning algorithm, such as a convolutional neural network consisting of several convolutional and pooling layers. The output of the pairwise representation learning is a learned feature representation of the trajectory pairs. Given all the pairs of trajectories relative to the key actor, the learnt representative vectors for all the pairs of trajectories can be combine together to form a representative feature for the group of people in the scene.

If the prior information about the key actor does not exist, one exemplary method is to form all possible pairs of trajectories and then combine all the learnt representative feature to form one representative feature vector for the group of people in the scene.

Visual Stream.

One can choose the C3D network [3] to handle incoming visual data. In experiments, the C3D structure shown in FIG. 2 has been used, and the feature from the sixth fully connected layer, fc6, where the number of output neurons is set to 512. Although a particular architecture is used for the visual stream in this exemplary embodiment, it can be replaced by any other visual information description system that generates a descriptive feature vector from a visual observation. In other words, this subnetwork takes video sequences as the input, so any other state-of-the-art methods used for video classification can be used as the visual stream.

Stream Fusion.

Since each stream is constrained to learning a certain pattern within its own data domain, it is helpful to take advantage of the two-stream architecture, forcing the two separate streams to share information with each other. To merge information, one can concatenate the output of each stream and pass the fused feature to a fully connected layer(s) to establish inter-stream/domain connectivity. The resulting feature vector is a representation of individual activity in a short sequence. Let row vectors $X_t \in \mathbb{R}^{F_t}$ and $X_v \in \mathbb{R}^{F_v}$ be the features extracted from the trajectory stream and visual stream respectively, where $F_*$ denotes the corresponding feature length (or the number of neurons in a fully connected layer). The fused output $Z_f \in \mathbb{R}^{F_f}$ is mathematically expressed as $$Z_f = \sigma([X_v, X_t] W_f) \quad (4)$$

where $W_f \in \mathbb{R}^{(F_v + F_t) \times F_f}$ are the weights in a fully connected layer. More fully connected layers could be built on top of $Z_f$ to accommodate complicated cases.

Shared Network For Multiple Persons.

To design a system for analyzing behaviors of a group of people in a scene, a separate network should be used for each person. However, this is prohibitive in the sense that the large number of resulting parameters would lead to large consumption of memory and long training time. Thus the following proposes to let all individuals share the same network and concatenate the output feature of each person. Then, establish inter-person connectivity using a fully connected layer.

It may be noted that when concatenation is performed, one implicitly enforces an order among this group of people. Arbitrarily enforcing such order can be problematic. To resolve this issue, the persons in the input list can be renumbered. Two approaches to achieve this are now provided. First, one could augment the training dataset by random permutation. Every time a sample (containing videos and trajectories of multiple persons) is fed into the network the list of people can be shuffled beforehand. As such, the network automatically learns to handle the permutation issue. Second, one could automatically mark a person as the key person according to a predefined rule and put this center person always in the first position of the list. Then, other people could be numbered according to their distances to the key person. In experiments, the first approach has been applied to the task of puck carrier detection and the second approach to the task of event recognition and team classification.

Now, suppose one has the fused feature $Z_f^{(i)} \in \mathbb{R}^{F_f}$ for person i ($1 \leq i \leq N_P$) Let $\{Z_t^{(i)} | 1 \leq i \leq N_P\}$ be a new set of features after renumbering and $h(\cdot)$ be an operator that returns the new rank of an input. For example, $h(3)$ might return 1, meaning the person originally at index 3 will be placed at index 1 after renumbering. Therefore:

$$Z_r^{(h(i))} = Z_f^{(i)} \quad (5)$$

To obtain the eventual feature representation of a group of people, one can concatenate all $Z_r^{(i)}$ and apply a fully connected layer afterwards to learn the inter-person relationships, shown below.

$$Z_e = \sigma([Z_r^{(1)}, Z_r^{(1)}, \ldots, Z_r^{(N_P)}] W_e) \quad (6)$$

In the above formula, $\sigma(\cap)$ denotes softmax normalization, $W_e \in \mathbb{R}^{(F_f N_P) \times F_e}$ are the weights of the fully connected layer, and $Z_e \in \mathbb{R}^{F_e}$ is the eventual feature representation which can be fed into a loss function for end-to-end training.

The learnt representation of the individual actions and group activities can be used to localize them in space and time. One straightforward solution is to adopt a variable- or fixed-length moving window approach followed by non-maximal suppression of the detection responses.

In summary, the above provides a combined network that represents the trajectories and visual appearance of all the people in a scene. This combined network can be used for a variety of activity analysis tasks, described next.

Datasets for Experimental Evaluations.

To evaluate the effectiveness of the disclosed method, the examples described herein focus on sport videos. Visual analysis in sports presents numerous challenges and has been found to be more complex than normal security and surveillance scenes. First, players typically move extremely fast and often frames are blurred due to this rapid movement. Thus, the input video clips do not always carry the rich visual information expected. Second, sports video, especially for team sports, contains numerous player interactions. In addition, the interactions are less constrained than regular human interactions in a normal setting such as an airport or a subway station. Interpreting those interactions can help understand their activities as a group, but the representations used to decode such interactions remains challenging.

The experiments have been conducted on two datasets. The first one includes trajectory information only without any visual information: basketball player tracks extracted from an external tracking system recording player positions in NBA basketball games. The second dataset incorporates both visual and trajectory information: player positions and appearances obtained from broadcast video footage of the NHL hockey games.

Figure 3:
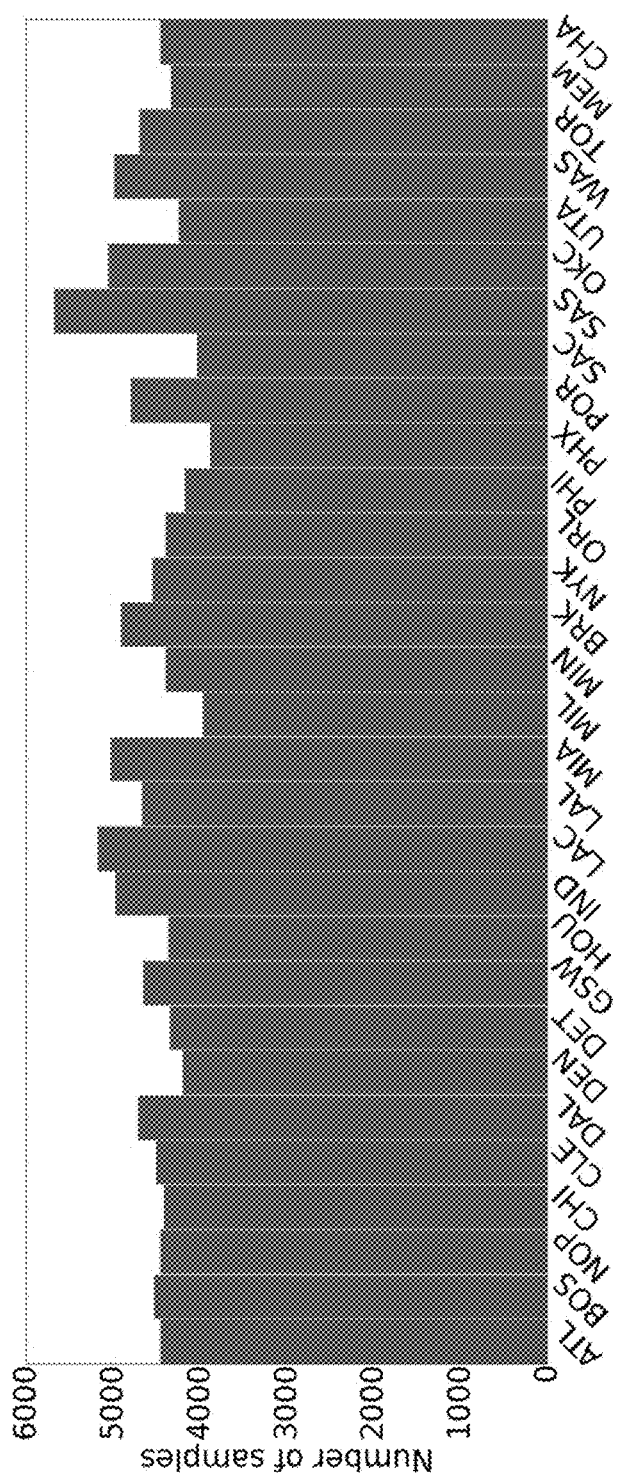
FIG. 3 is a graph showing the number of possessions of each team in an NBA games dataset.

The STATS SportVU NBA dataset includes real-world positions of players and the ball in 2D world coordinates captured by a six-camera system at a frame rate of 25 Hz. Each frame has complete annotations of the events happening in this frame, such as dribble, possession, shot, pass and rebound. The dataset used has 1076 games during the 2013-2014 NBA season with around $10^6$ frames in each game. This dataset is used for team classification—i.e. to determine the identity of a team from the trajectories of its players during a game. 137176 possessions were extracted from the 1076 games for experiments. Each possession starts with an offensive team having possession of the ball and ends with a shot. One can fix possession length to 200 frames. If a possession is longer than 200 frames, it can be cropped starting from the last frame and the number of frames counted backward until it reaches 200. If a possession is shorter than 200 frames, one can pad zeros to it. Originally there are 25 frames per second, but one can sample only half of the frames in a second, so the sampled 200 frames actually represent a 16 seconds (200 frames at 25 frames per second) long sequence. There are in total 30 NBA teams. FIG. 3 shows the number of possessions extracted from each team in the dataset. It can be seen that this is a relatively balanced dataset, each team having a similar number of samples for experiments.

Figure 4:
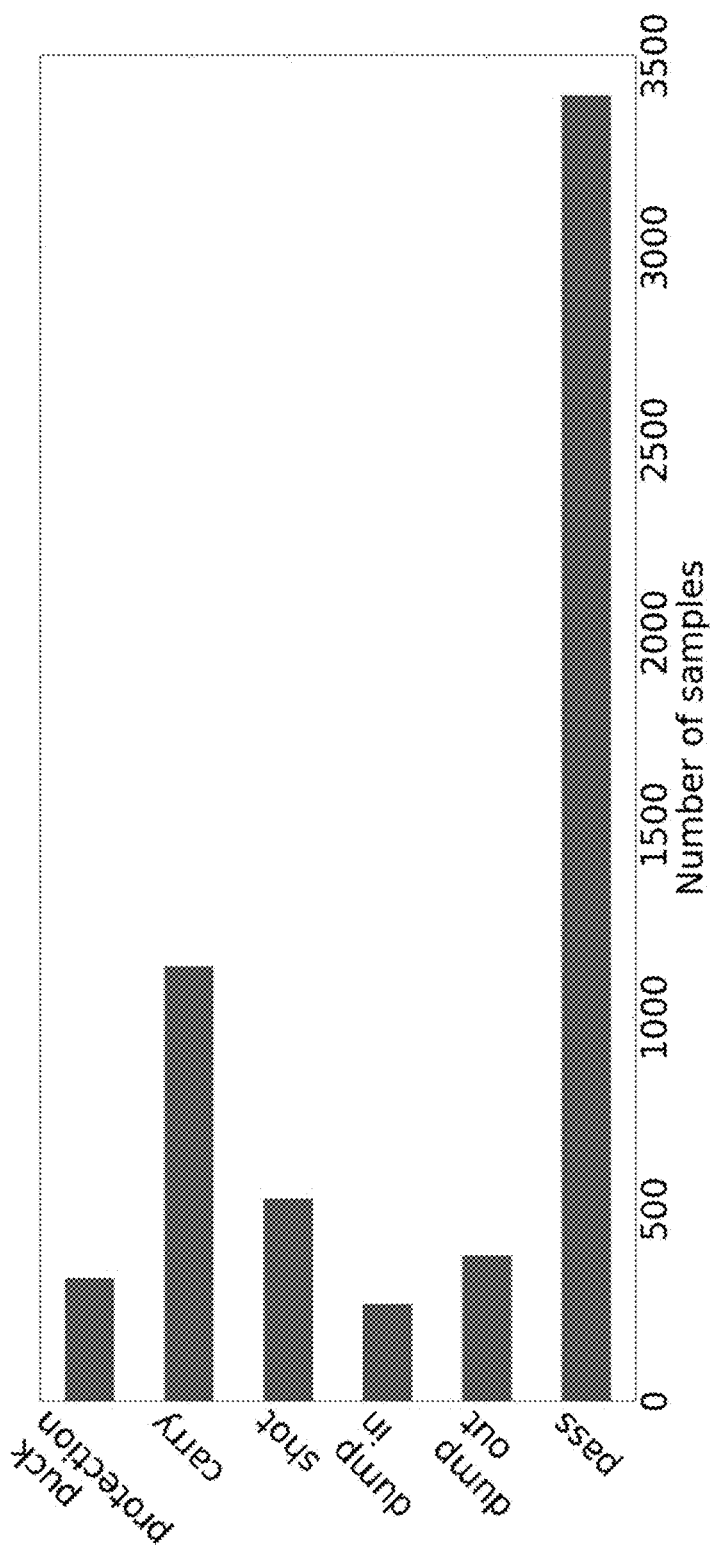
FIG. 4 is a graph showing the number of samples per event in an NHL games dataset.

An NHL dataset used experimentally has both video and trajectory data. Unlike the NBA dataset where person trajectories are obtained from a multi-camera system, the real-world player positions in the NHL dataset are estimated using a single broadcast camera and a homography transformation. Similarly, the NHL dataset also has detailed event annotation for each frame, each event being categorized into a super class and a fine-grained class. In the performed experiments, 8 games with 6 super classes were used: pass, dump out, dump in, shot, puck carry and puck protection. FIG. 4 shows the fraction of each event in the 8-game dataset. It may be observed that this dataset is a highly unbalanced set in terms of number of different events. In a hockey game, there are 4 on-ice officials and 12 players (6 on each team). Thus, there can be at most 16 persons on the rink at the same time. In the following distinction between officials and players is not made, and "player" is used to refer to all people on the rink. Because the dataset is created from NHL broadcast videos where not all players are visible in each frame, a threshold $N_P$ can be set so that the model can handle a fixed number of players. If the number of players available in a frame is fewer than $N_P$, one can pad with zeros the part where players are unavailable.

Each training sample includes data from $N_P$ players. The data of each player includes a T-frame video clip (cropped from raw video using bounding boxes) and the corresponding T-frame trajectory estimated from this video clip. It may be noted that the model supports variable-length input. If in some frames a player is not available, one can set the data in these frames to zeros. In the performed experiments, $N_P$ is set to 5 and video frame size is set to 96×96. T can be set to 16 by first locating the center frame where an event happens and then cropping 7 frames before the center frame plus 8 frames after it. If the center frame of a certain event happens to be close to that of another event within 15 frames, this sample can be dropped.

Experiments.

Experiments were conducted on both the NBA and NHL datasets. To demonstrate that 1D convolution is capable of learning temporal dynamics of person trajectories, team classification is performed using the NBA dataset. Then key player detection and event recognition are performed on the NHL dataset to show that how adding trajectory information boosts the performance on both tasks.

Team Classification on the NBA Dataset

Experiment Settings: Since the NBA dataset only has trajectory data, the whole structure described in FIG. 2 was not used. Instead, only the 1D convolutional network was used. To handle the permutation issue mentioned previously, players are renumbered according to their distances to the ball. The closest is No. 1 and the farthest is No. 5. Then, the x and y coordinates of the ball and 5 players are stacked together, resulting in a 200×12 matrix as an input, where 200 is the length of the input sequence and 12 is the number of channels. 60% of the 1076 games were used for training, 20% for validation and 20% for testing.

Measurement: The performance of the model was measured according to the following metrics: accuracy and hit-at-k. Accuracy (hit-at-k accuracy means if any one of the top-k predictions equals the ground truth label, it is claimed as being correctly classified), both of which are calculated over possessions. However, a single trajectory series can hardly display the full underlying pattern a team might possess. To resolve this issue, it is proposed to use all possessions in a game and classify the game as a whole using majority voting. For example, if most possessions in a game are predicted as Golden State Warriors, then the model predicts this game to be with the Golden State Warriors. Experiments have shown that the per-possession accuracy can be largely improved when aggregated to game level (see results of "acc" and "game acc" in Tables 1, 2 and 3). These numbers are significantly higher than chance performance of 1/30=3.3%.

Analysis:

One can explore the architecture of the model by varying the number of convolutional layers, the filter size and the number of filters in each layer. Tables 1, 2 and 3 show the results respectively. From Tables 1 and 3, it can be seen that by increasing the number of layers and filters, generally one could obtain a more complex model to achieve better performance. However, as the number of parameters in the model is increased, there could be a potential limit that could prohibit one from acquiring further improvement by increasing the model complexity. For example, by adding two fully connected layers after the 5conv model in Table 1, only a slight elevation in possession-based accuracy and a drop in game-based accuracy may be experienced. Also, it may be noted that in Table 2, using small filter sizes generally leads to good results (see the first three models in Table 2). If one slightly increases the filter size, a large decrease in model performance can be experienced (see the last model in Table 2).

Table 1: Metrics on models with different number of layers. All convolutional layers use a filter size of 3 except the first layer, where the filter size is 5. The number of filters in next layer is double the number in previous layer except the fifth layer (if any), where the number of filters is the same as that in the fourth layer. The number of neurons in fully connected layer is set to 1024.

TABLE 1

| layers | acc | hit@2 | hit@3 | game acc |
|---|---|---|---|---|
| 2conv | 10.68% | 18.09% | 24.31% | 50.00% |
| 3conv | 18.86% | 28.89% | 36.47% | 87.05% |
| 4conv | 22.34% | 33.03% | 40.47% | 93.41% |
| 5conv | 24.78% | 35.61% | 42.95% | 95.91% |
| 5conv + 2fc | 25.08% | 35.83% | 42.85% | 94.32% |

Table 2: Metrics on models with different filter sizes. All models in the table use five convolutional layers with no fully connected layer. The filter sizes listed is in a bottom-up order and the number of filters used are 64, 128, 256, 512, 512 (bottom-up order).

TABLE 2

| filter sizes | acc | hit@2 | hit@3 | game acc |
|---|---|---|---|---|
| 3 3 3 2 2 | 24.24% | 35.36% | 43.25% | 94.10% |
| 5 3 3 3 3 | 24.78% | 35.61% | 42.95% | 95.91% |
| 7 5 5 3 3 | 23.12% | 33.48% | 41.04% | 95.45% |
| 9 7 7 5 5 | 14.13% | 23.15% | 30.01% | 62.05% |

Table 3: Metrics on models with different number of filters. All models in the table use five convolutional layers with no fully connected layer. The base number of filters listed in the table is the number of filters in the first layer. The number of filters in next layer is double the number in previous layer except that the fourth and the fifth layers have the same number of filters.

TABLE 3

| base # filters | acc | hit@2 | hit@3 | game acc |
|---|---|---|---|---|
| 16 | 20.37% | 30.71% | 38.21% | 81.14% |
| 32 | 23.73% | 34.55% | 41.85% | 92.95% |
| 64 | 24.78% | 35.61% | 42.95% | 95.91% |
| 128 | 21.81% | 32.10% | 39.24% | 94.45% |

Figure 5B:
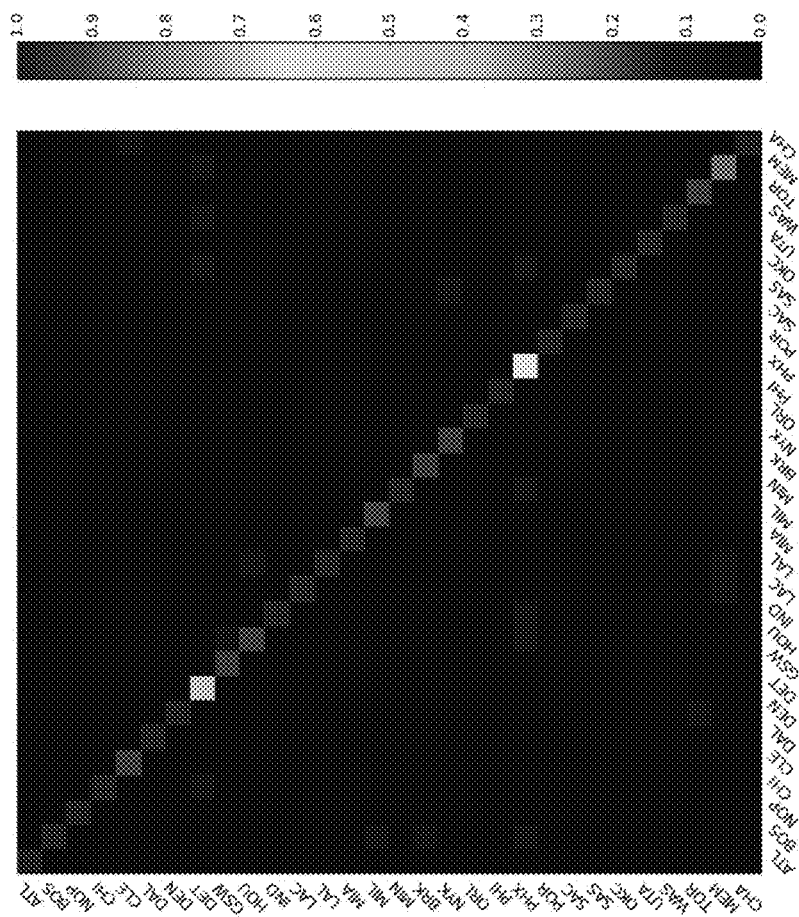
FIG. 5(b) is a confusion matrix based on game-wise classification.
Figure 5A:
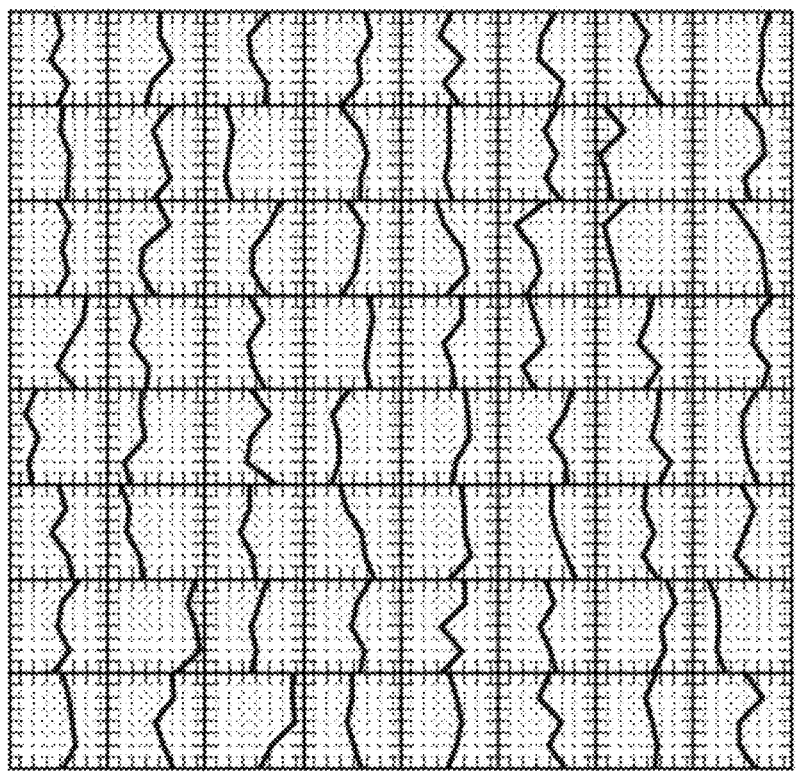
FIG. 5 (a) is a visualization of the filters in a first convolutional layer.

FIG. 5 shows the confusion matrix created from the 5conv model in Table 1. For most teams, the model (when aggregated to game level) can correctly predict the label. The worst case is Phoenix Suns (PHX in FIG. 5), the model has only a probability of around 65% to classify it correctly, but this is still much better than chance performance. Both FIGS. 5(*a*) and 5(*b*) are created using the 5conv model in Table 1.

To see what kind of patterns the model learns over the time dimension, one can visualize a small fraction of the filters in the first convolutional layer. In FIG. 5, 64 filters learned from the input sequence of x coordinates of the ball are shown. Some of them appear to be "Z" or "S" shaped and some appear to be "M" or "W" shaped. Some of them are similar, so there could be redundancy in these filters. These temporal patterns are the building blocks that form discriminative representations to distinguish teams.

Key Actor (Puck Carrier) Detection on the NHL Dataset: Given an input scene, a goal may be to detect the player who is currently in possession of the puck. One can annotate the dataset by which player has the puck at the moment an event takes place. For example, if a player is passing the puck to a teammate, within a small time window (16-frame window in our case) the player must have the puck, so he/she is the puck carrier. The events used are pass, dump in, dump out, shot, carry and puck protection as shown in FIG. 4. A one-hot vector was used to represent the ground truth label (who has the puck) and model the task as a classification problem.

Experiment Settings: One can use accuracy to evaluate on the proposed two-stream model as well as two baselines. The two baselines use only either the visual stream or the trajectory stream. For the two-stream model, one can use the exact model shown in FIG. 2 except that two shared fully connected layers (with 2048 and 512 output neurons respectively) are used to merge the trajectory stream and visual stream. For the trajectory stream, the filter sizes are 3, 3, 3, 2 and the numbers of filters in each layer are 64, 128, 256, 512 (all in bottom-up order). All max pooling uses a step size of 2. To handle the permutation problem as described above, one can randomly shuffle the list of player candidates for each sample during training. In the experiments, 4 games were used for training, 2 games for validation, and 2 games for testing.

Experiment Results: Table 4 shows the results. It was found that by combining visual data with trajectory data, one can achieve better accuracy. Compared to the 1D conv model, considering visual features as extra cues in the two-stream model leads to large improvement in performance. Compared to C3D, the two-stream model has a small performance gain.

TABLE 4

Puck carrier detection accuracy for each event.

| | C3D | 1D conv | C3D + 1D conv |
|---|---|---|---|
| pass | 74.23% | 45.93% | 74.23% |
| dump out | 73.63% | 38.46% | 74.73% |
| dump in | 69.57% | 40.58% | 72.46% |
| shot | 82.09% | 52.24% | 82.84% |
| carry | 72.57% | 56.25% | 75.00% |
| puck protection | 73.33% | 29.33% | 70.67% |
| all events | 74.31% | 46.88% | 74.88% |

Event Recognition On The NHL Dataset: The events used are pass, dump out, dump in, shot, carry and puck protection. The goal is to predict the event label given the short video clips and trajectories of 5 players on the rink. The number of samples of each event in the dataset are shown in FIG. 4. It is apparent that this dataset is highly unbalanced with the pass event taking up half of the dataset. To resolve this problem, one can minimize a weighted cross-entropy loss function during training. The weighting for each class is in inverse proportion to its frequency in the dataset.

Experiment Settings: Average precision was used as the metric and the performance of the proposed two-stream model was compared with that of the C3D model and the 1D convolutional network. For the two-stream model, the exact model shown in FIG. 2 was used, where one shared fully connected layer with 2048 neurons is used to merge the two streams. The weights in the loss function for pass, dump out, dump in, shot, carry and puck protection are 0.07, 0.6, 1, 0.4, 0.2 and 0.7 respectively. To resolve the permutation issue mentioned above, an order was enforced among the $N_P$ players by renumbering the players according to the following rule. Define the player directly related to an event as the key player or key actor. Then calculate the distances of other players to the key person and rank them by increasing distances. The closest has the highest rank and the farthest has the lowest rank. In experiments, 4 games were used for training, 2 games for validation and 2 games for testing.

Figures 8A, 8B:
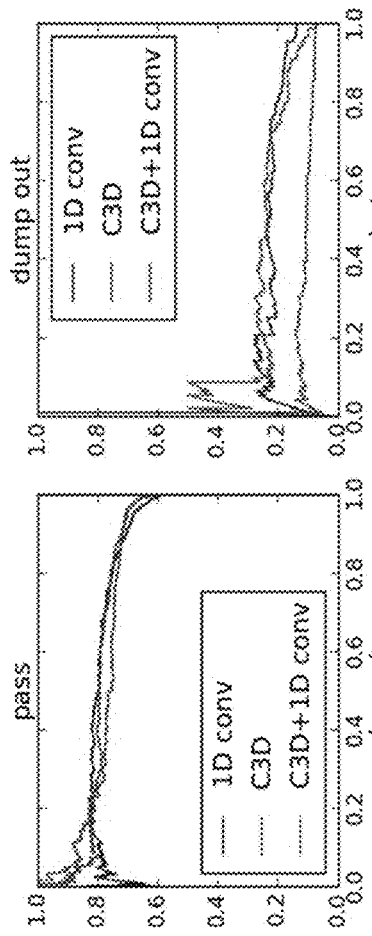
FIGS. 8(a) to 8(f) show a series of precision recall curves for each event in an NHL games dataset.
Figures 8C, 8D:
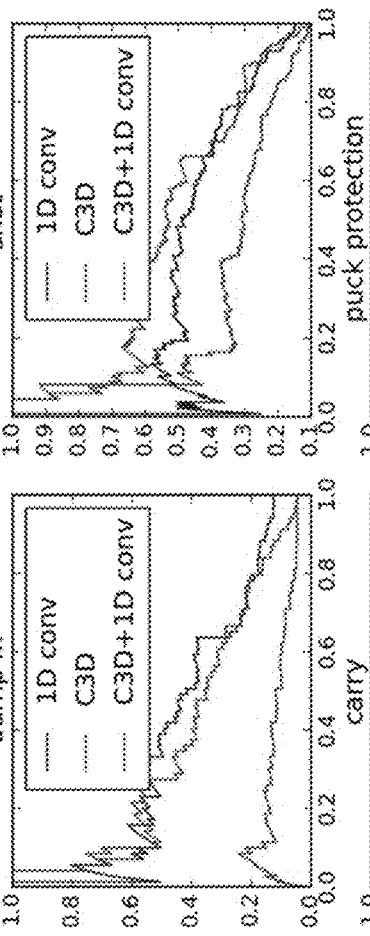
Figures 8E, 8F:
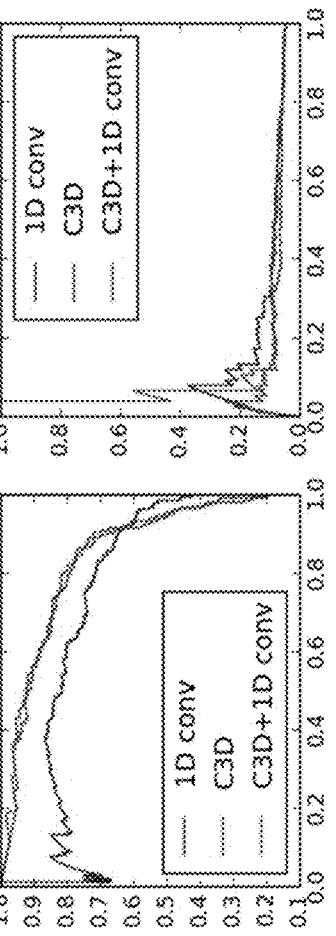

Experiment Results: The results are shown in Table 5. The mean average precision with the two-stream model is nearly 10 percentage points higher than that of C3D. Further, in FIG. 8, it is clear to see that the precision-recall curve of the two-stream model is better than that of C3D for most events.

The two-stream model outperforms C3D by a large margin, demonstrating the effectiveness of adding trajectory data.

Figure 7:
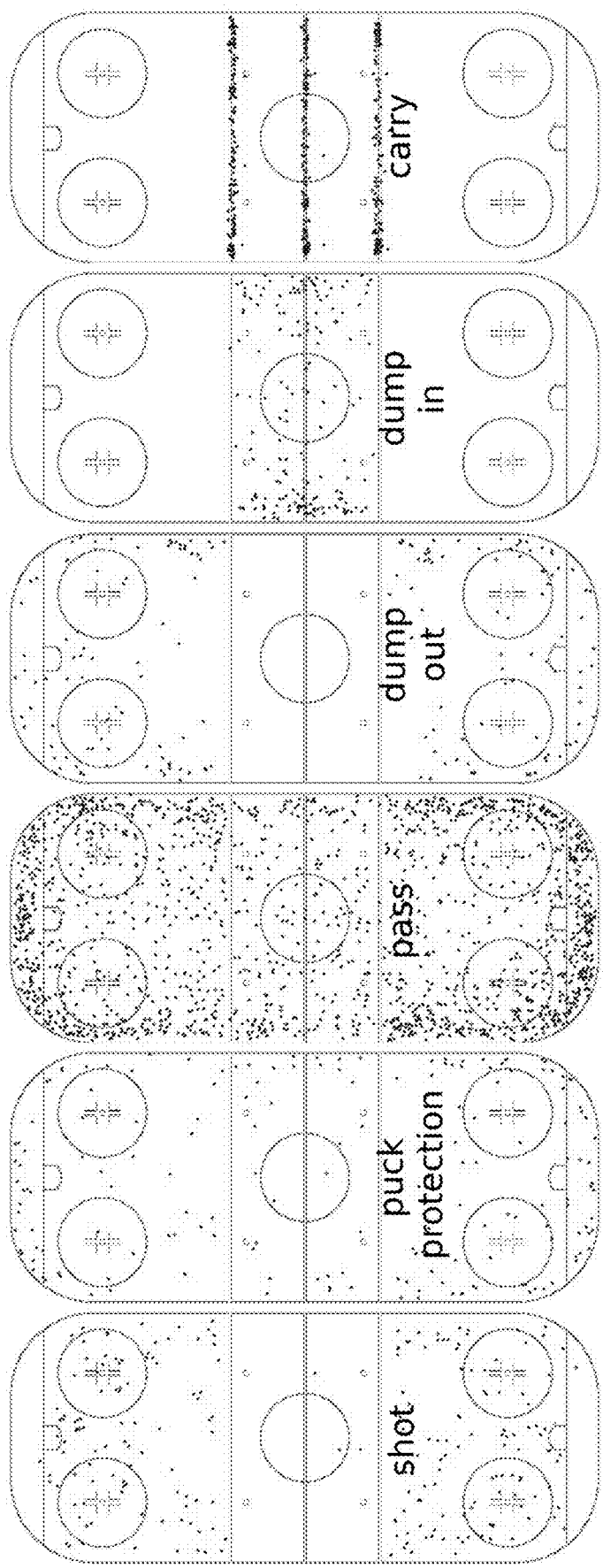
FIG. 7 illustrates a visualization of locations where events happen, with samples drawn from a test set.

Even considering 1D convolution on trajectory data alone can beat the C3D model. We believe this is due to the strong relationship between events and the spatial locations. As is shown in FIG. 7, different events tend to have different spatial distributions over the rink. For example, carry happens near the three lines in the middle; dump in happens within the neutral zone; dump out mostly happens around the corner and boundary. This strong spatial correlation explains the importance of trajectory data for analyzing player behaviors.

Figure 6A:
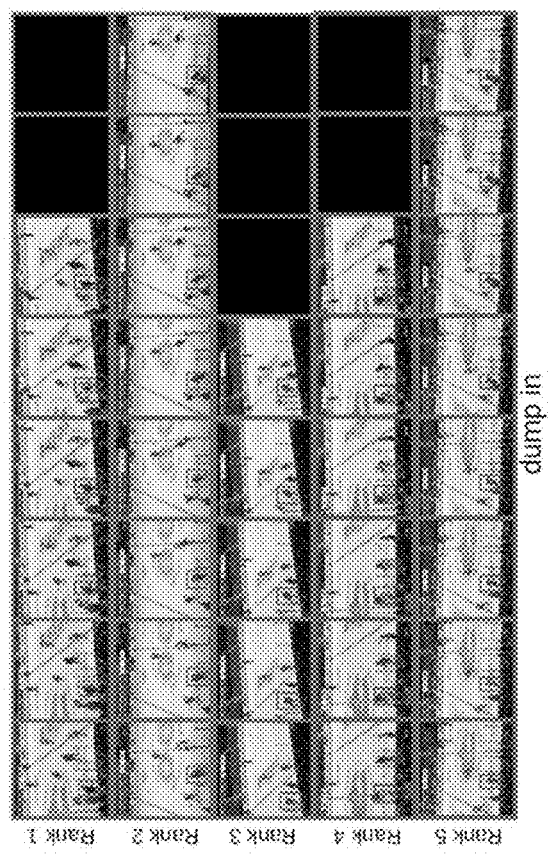
FIGS. 6(a) and 6(b) illustrates the top 5 candidates retrieved as dump in and dump out respectively.
Figure 6B:
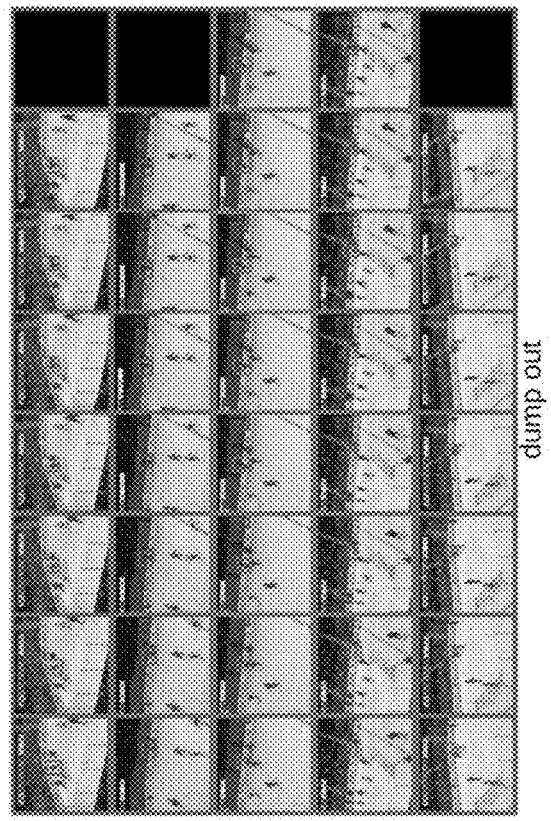

One can visualize the top 5 candidates retrieved as dump in and dump out in FIG. 6. For other events, the top 5 candidates are either all true positive (for pass, carry and shot) or false positive (for puck protection). In FIG. 6, green ones are the true positives while red ones are the false positives. The person with a bounding box is the key player who is performing the action. This figure only shows 8 frames of the 16-frame video clip by sub-sampling. If a frame is black, it means the key player is missing because of failure to detect and track the player. As can be seen from FIG. 6, the retrieved events look similar. Even from a human perspective, it is hard to predict the label of a given sample, showing the difficulty of this task.

TABLE 5

Average precision for each event.

|  | C3D | 1D conv | C3D + 1D conv |
|---|---|---|---|
| pass | 77.30% | 77.73% | 79.15% |
| dump out | 10.17% | 22.30% | 23.27% |
| dump in | 10.25% | 39.39% | 37.29% |
| shot | 34.17% | 42.42% | 50.86% |
| carry | 86.37% | 77.21% | 86.21% |
| puck protection | 11.83% | 9.87% | 8.43% |
| mAP | 38.35% | 44.89% | 47.54% |

Numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles. The steps or operations in the flow charts and diagrams described herein are just for example. There may be many variations to these steps or operations without departing from the principles discussed above. For instance, the steps may be performed in a differing order, or steps may be added, deleted, or modified.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

REFERENCES

[1] H. Kuehne, H. Jhuang, E. Garrote, T. Poggio, T. Serre: "HMDB: a large video database for human motion recognition", *The International Conference on Computer Vision (ICCV)*, 2011.

[2] Andrej Karpathy, George Toderici, Sanketh Shetty, Thomas Leung, Rahul Sukthankar, Li Fei-Fei: "Large-scale video classification with convolutional neural networks", *Computer Vision and Pattern Recognition (CVPR)*, pp. 1725-1732, 2014.

[3] Du Tran, Lubomir Bourdev, Rob Fergus, Lorenzo Torresani, Manohar Paluri: "Learning spatiotemporal features with 3d convolutional networks", *International Conference on Computer Vision (ICCV)*, pp. 4489-4497, 2015.

[4] Tian Lan, Yang Wang, Weilong Yang, Stephen Robinovitch, Greg Mori: "Discriminative Latent Models for Recognizing Contextual Group Activities", *IEEE Transactions on Pattern Analysis and Machine Intelligence (T-PAMI)*, pp. 1549-1562, 2012.

[5] G. Médioni, I. Cohen, F. Brémond, S. Hongeng, R. Nevatia: "Event Detection and Analysis from Video Streams", *IEEE Transactions on Pattern Analysis and Machine Intelligence (T-PAMI)*, pp. 873-889, 2001.

[6] Joachim Gudmundsson, Michael Horton: "Spatio-Temporal Analysis of Team Sports—A Survey", *arXiv preprint arXiv:1602.06994*, 2016.

[7] Sepp Hochreiter, Jürgen Schmidhuber: "Long short-term memory", *Neural computation*, pp. 1735-1780, 1997.

[8] Daniel Weinland, Remi Ronfard, Edmond Boyer: "A survey of vision-based methods for action representation, segmentation and recognition", *Computer Vision and Image Understanding (CVIU)*, pp. 224-241, 2011.

[9] M. Javan Roshtkhari. M. D. Levine, "Online dominant and anomalous behavior detection in videos", *Computer Vision and Pattern Recognition (CVPR). 2013 IEEE Conference on*, 2013, pp. 2609-2616.
[10] Burghouts, Gerardus Johannes. "Detection of human actions from video data." U.S. patent application Ser. No. 14/439,637, filed Oct. 31, 2013.
[11] M. Javan Roshtkhari. M. D. Levine, "System and method for visual event description and event analysis", PCT application PCT/CA2015/050569, filed Jun. 19, 2015.
[12] M. Javan Roshtkhari. M. D. Levine, "Human activity recognition in videos using a single example", *Image and Vision Computing*, 2013, 31(11), 864-876.
[13] Karen Simonyan, Andrew Zisserman: "Two-stream convolutional networks for action recognition in videos", *Advances in Neural Information Processing Systems (NIPS)*, pp. 568-576, 2014.
[14] Jeffrey Donahue, Lisa Anne Hendricks, Sergio Guadarrama, Marcus Rohrbach, Subhashini Venugopalan, Kate Saenko, Trevor Darrell: "Long-term recurrent convolutional networks for visual recognition and description", *Computer Vision and Pattern Recognition (CVPR)*, pp. 2625-2634, 2015.
[15] Wongun Choi, Khuram Shahid, Silvio Savarese: "What are they doing?: Collective activity classification using spatio-temporal relationship among people", *Computer Vision Workshops (ICCV Workshops)*, pp. 1282-1289, 2009.
[16] Mohamed Rabie Amer, Peng Lei, Sinisa Todorovic: "Hirf: Hierarchical random field for collective activity recognition in videos", *European Conference on Computer Vision (ECCV)*, pp. 572-585, 2014.
[17] Tian Lan, Leonid Sigal, Greg Mori: "Social Roles in Hierarchical Models for Human Activity Recognition", *Computer Vision and Pattern Recognition (CVPR)*, 2012.
[18] V. Ramanathan, B. Yao, and L. Fei-Fei. "Social role discovery in human events". In Computer Vision and Pattern Recognition (CVPR), June 2013.
[19] Z. Deng, M. Zhai, L. Chen, Y. Liu, S. Muralidharan, M. Roshtkhari, and G. Mori: "Deep Structured Models For Group Activity Recognition", *British Machine Vision Conference (BMVC)*, 2015.
[20] Stephen S. Intille, Aaron Bobick: "Recognizing Planned, Multiperson Action", *Computer Vision and Image Understanding (CVIU)*, pp. 414-445, 2001.

The invention claimed is:

1. A method for automatically analyzing and understanding activities and interactions, the method comprising:
   receiving trajectory data comprising a set of location data related to the coordinates of one or more individual objects in a scene and their movements;
   applying at least one machine learning or artificial intelligence technique to the trajectory data to automatically learn combinations of movements that are indicative of actions or interactions of the objects;
   inferring individual and group activities in the scene based on the information learnt from the trajectory data; and
   providing at least one individual or group activity as an output.

2. The method of claim 1 further comprising generating a representative feature vector in a high dimensional space for each trajectory using a training dataset.

3. The method of claim 2 wherein a training dataset comprises at least one labeled activity or event.

4. The method of claim 1, wherein the activities are human actions, human-human interactions, human-object interactions, or object-object interactions.

5. The method of claim 1 wherein the location information corresponds to a position of the object in the scene as a function of time with respect to a pre-defined coordinate system.

6. The method of claim 1, wherein a key actor corresponding to an entity carrying out a main action characterizing the group activity is identified and provided as a prior input.

7. The method of claim 1, further comprising identifying and localizing a key actor in a group activity.

8. The method of claim 1, further comprising localizing the individual and group activities in space and time.

9. The method of claim 1, wherein the output is provided to annotate, tag, and/or index input data or a portion thereof for content based information retrieval, database indexing and/or searching.

10. The method of claim 1, wherein the output is provided to describe a context of the scene and generate one or more content-related tags.

11. The method of claim 1, wherein the output is provided to an application for any one or more of: sports analytics, crowd monitoring, surveillance, or traffic monitoring and analysis.

12. A method for automatically analyzing and understanding activities and interactions, the method comprising:
    receiving trajectory data comprising a set of location data related to the coordinates of one or more individual objects in a scene and their movements;
    receiving visual information about the scene and at least one individual object in the scene;
    applying at least one first machine learning or artificial intelligence technique to the trajectory data to automatically learn combinations of movements that are indicative of actions or interactions of the objects;
    applying at least one second machine learning or artificial intelligence technique to automatically learn an informative representation of visual appearance data;
    combining the location trajectory and visual appearance data to identify individual and group activities in the scene; and
    providing at least one individual or group activity as an output.

13. The method of claim 12 further comprising generating a representative feature vector in a high dimensional space for each trajectory using a training dataset.

14. The method of claim 12 further comprising receiving a representative feature vector in a high dimensional space for the visual information using a training dataset.

15. The method of claim 13 wherein a training dataset comprises at least one labeled activity or event.

16. The method of claim 12, wherein activities are human actions, human-human interactions, human-object interactions, or object-object interactions.

17. The method of claim 12 wherein the location information corresponds to a position of the object in the scene as a function of time with respect to a pre-defined coordinate system.

18. The method of claim 12 wherein the visual information is at least one image of a scene acquired by an imaging device.

19. The method of claim 12 wherein the visual information and location information are temporally synchronized.

20. The method of claim 12, wherein a key actor corresponding to an entity carrying out a main action characterizing the group activity is identified and provided as a prior input.

21. The method of claim 12, further comprising identifying and localizing a key actor in a group activity.

22. The method of claim 12, further comprising localizing the individual and group activities in space and time.

23. The method of claim 12, wherein the output is provided to annotate, tag, and/or index input data or a portion thereof for content based information retrieval, database indexing and/or searching.

24. The method of claim 12, wherein the output is provided to describe a context of the scene and generate one or more content-related tags.

25. The method of claim 12, wherein the output is provided to an application for any one or more of: sports analytics, crowd monitoring, surveillance, or traffic monitoring and analysis.

26. A non-transitory computer readable medium comprising computer executable instructions for automatically analyzing and understanding activities and interactions, comprising instructions for:
    receiving trajectory data comprising a set of location data related to the coordinates of one or more individual objects in a scene and their movements;
    applying at least one machine learning or artificial intelligence technique to the trajectory data to automatically learn combinations of movements that are indicative of actions or interactions of the objects;
    inferring individual and group activities in the scene based on the information learnt from the trajectory data; and
    providing at least one individual or group activity as an output.

27. A non-transitory computer readable medium comprising computer executable instructions for automatically analyzing and understanding activities and interactions, comprising instructions for:
    receiving trajectory data comprising a set of location data related to the coordinates of one or more individual objects in a scene and their movements;
    receiving visual information about the scene and at least one individual object in the scene;
    applying at least one first machine learning or artificial intelligence technique to the trajectory data to automatically learn combinations of movements that are indicative of actions or interactions of the objects;
    applying at least one second machine learning or artificial intelligence technique to automatically learn an informative representation of visual appearance data;
    combining the location trajectory and visual appearance data to identify individual and group activities in the scene; and
    providing at least one individual or group activity as an output.

28. A system comprising a processor and memory, the memory comprising computer executable instructions for automatically analyzing and understanding activities and interactions, comprising instructions for:
    receiving trajectory data comprising a set of location data related to the coordinates of one or more individual objects in a scene and their movements;
    applying at least one machine learning or artificial intelligence technique to the trajectory data to automatically learn combinations of movements that are indicative of actions or interactions of the objects;
    inferring individual and group activities in the scene based on the information learnt from the trajectory data; and
    providing at least one individual or group activity as an output.

29. A system comprising a processor and memory, the memory comprising computer executable instructions for automatically analyzing and understanding activities and interactions, comprising instructions for:
    receiving trajectory data comprising a set of location data related to the coordinates of one or more individual objects in a scene and their movements;
    receiving visual information about the scene and at least one individual object in the scene;
    applying at least one first machine learning or artificial intelligence technique to the trajectory data to automatically learn combinations of movements that are indicative of actions or interactions of the objects;
    applying at least one second machine learning or artificial intelligence technique to automatically learn an informative representation of visual appearance data;
    combining the location trajectory and visual appearance data to identify individual and group activities in the scene; and
    providing at least one individual or group activity as an output.

* * * * *